US007718299B2

(12) United States Patent
Madeleine et al.

(10) Patent No.: US 7,718,299 B2
(45) Date of Patent: May 18, 2010

(54) FUEL CELL BIPOLAR PLATE AND FUEL CELL WITH IMPROVED FLUID DISTRIBUTION EMPLOYING SUCH PLATES

(75) Inventors: Sylvain Madeleine, Grenoble (FR); Philippe Manicardi, Fontaine (FR); Jean-Philippe Poirot-Crouvezier, Saint-Georges de Commiers (FR)

(73) Assignee: Commissariat A l'Energie Atomique, Paris (FR)

( * ) Notice: Subject to any disclaimer, the term of this patent is extended or adjusted under 35 U.S.C. 154(b) by 0 days.

(21) Appl. No.: 12/277,570

(22) Filed: Nov. 25, 2008

(65) Prior Publication Data
US 2009/0075154 A1 Mar. 19, 2009

Related U.S. Application Data

(63) Continuation of application No. PCT/FR2007/051335, filed on May 28, 2007.

(30) Foreign Application Priority Data
Jun. 21, 2006 (FR) .................................. 06 52579

(51) Int. Cl.
*H01M 2/00* (2006.01)
*H01M 2/08* (2006.01)
*H01M 2/14* (2006.01)

(52) U.S. Cl. .............................. 429/35; 429/34; 429/38; 429/39

(58) Field of Classification Search .................... 429/22, 429/26, 32, 34–36, 38–39
See application file for complete search history.

(56) References Cited

U.S. PATENT DOCUMENTS

| 2005/0271910 A1 | 12/2005 | Bai et al. |
| 2005/0277013 A1 | 12/2005 | Yamaga et al. |
| 2006/0172177 A1 | 8/2006 | Scherer et al. |

FOREIGN PATENT DOCUMENTS

| DE | 10 2004 057447 A1 | 6/2006 |
| JP | 2002-298872 A1 | 10/2002 |
| WO | 2006/090621 A1 | 8/2006 |

*Primary Examiner*—Dah-Wei D Yuan
*Assistant Examiner*—Claire L Rademaker
(74) *Attorney, Agent, or Firm*—Burr & Brown

(57) ABSTRACT

A bipolar plate for a fuel cell including a first through-hole positioned within one of its peripheral edges for circulating a reactive fluid, an anode compartment extending at one of its two main faces, and a cathode compartment extending at the opposite main face. At least one of the compartments is formed completely or partially by a region recessed with respect to the corresponding main face. The recessed region is connected to the through-hole via an intake channel that is recessed within the peripheral edge of the corresponding main face for the reactive fluid to flow into the compartment. A second through-hole located near the first through-hole is provided and is intended for circulating the reactive fluid. The main face opposite the face housing the recessed region comprises a generally non-emergent groove that connects the first and second through-holes.

7 Claims, 4 Drawing Sheets

FUEL CELL BIPOLAR PLATE AND FUEL CELL WITH IMPROVED FLUID DISTRIBUTION EMPLOYING SUCH PLATES

FIELD OF THE INVENTION

The present invention relates to the field of fuel cells, in particular to the field of fuel cells comprising a superposition of similar elementary cells. More particularly, the present invention relates to a bipolar plate for forming such elementary cells. It also relates to fuel cells employing such plates.

PRIOR ART

A fuel cell may be composed of a superposition or a stack of several elementary cells having matching dimensions. Each of these elementary cells generally comprises an electrolyte in membrane form, and a bipolar plate having an anode and a cathode.

In order to cause an oxidation and a reduction, for generating the emission of charge carriers, a fuel and an oxidizer must be placed respectively in contact with these electrodes. The electrochemical oxidation and reduction reactions thereby liberate ions, whose movement produces the electric current delivered by the fuel cell. In general, the fuel and the oxidizer are in the form of fluids, that is in the form of liquids or in the form of gases.

In a manner known per se, a bipolar plate has two main faces. At one of these two main faces, a bipolar plate comprises an anode compartment extending over a substantial portion of this area. In a relatively symmetrical manner, at the other main face, the bipolar plate comprises a cathode compartment extending over a substantial portion of the area of this main face. It is in these compartments that the half-reactions take place, respectively oxidation and reduction, when the two faces of the bipolar plate are in contact with electrolytes in the form of membranes.

An elementary cell is therefore composed of a bipolar plate superposed on a membrane electrolyte. In the stack of elementary cells forming the fuel cell, bipolar plates and membranes comprising the electrolyte therefore alternate.

As an example of such cells, mention can be made of proton exchange membrane fuel cells (PEMFC) and direct methanol fuel cells (DFMC).

During the operation of the cell, the oxidizer and the fuel are introduced in fluid form and continuously, to sustain the electrochemical reaction producing the desired electric current.

In the presence of the fuel, an oxidation half-reaction takes place at the interface between the anode compartment and the membrane electrolyte. In general, the fuel introduced, acting as a reducing agent, consists of molecular hydrogen ($H_2$) in the gas state. Similarly, in the presence of the oxidiser, a reduction half-reaction takes place at the interface between the cathode compartment and the membrane electrolyte. In general, the oxidiser introduced, acting as an oxidising agent, is molecular oxygen ($O_2$) in the gas state, which is often introduced in the form of air.

To ensure the proper operation and a satisfactory yield of a fuel cell consisting of a superposition of elementary cells, the cell architecture must serve to perform a number of functions, including the following:
 the intake and distribution of the reactive fluids,
 leaktightness of the fluid circuits,
 cooling or removal of the products of the electrochemical reactions, removal of the heat liberated by the electrochemical reactions which are exothermic,
 conduction of the electric charge carriers liberated during these reactions,
 and the mechanical cohesion of the stack formed by the elementary cells.

These various functions influence the structure of the elementary cells and particularly that of the bipolar plates making them up.

To place the reactive fluids, oxidiser and/or fuel, in contact with the anode and cathode compartments of each elementary cell, it is known to circulate each of these fluids in a collector formed along the fuel cell by the superposition of through-holes of each elementary cell, that is bipolar plate and membrane electrolyte.

Thus, each bipolar plate is traversed by a hole generally extending in a direction perpendicular to the two main faces of the plate, which is usually planar. The hole passing through the bipolar plate is generally made at a peripheral edge of the bipolar plate, while the anode and cathode compartments occupy the central part of each of the faces of the bipolar plate. Since the through-hole forming a common collector is located at a certain distance from the anode or cathode compartment, which it is intended to supply with reactive fluid, an intake channel must also be machined in the bipolar plate for the flow of the reactive fluid from the collector to the electrode.

For this purpose, a first solution consists in drilling a hole connecting the electrode to be supplied to the edge of the bipolar plate located near the through-hole forming the collector. Such a perforation is generally made in a direction perpendicular to the edge in which it originates and therefore perpendicular to the through-hole forming the collector. A sealed plug is then inserted between the collector and the edge of the bipolar plate, in order to prevent leaks of reactive fluids. Such a plug may be fixed by shrink-fit or by adhesive.

However, these drilling and bonding operations are relatively meticulous to perform and the presence of a plug does not absolutely eliminate any risk of leakage. These risks and the additional cost incurred by these operations are commensurately higher when the elementary cells making up the fuel cell are more numerous.

Alternatively, one solution of the prior art consists in drilling an oblique hole between the collector and the compartment to be supplied. To permit access of the drilling bit, the starting point of such a drilling is located towards one of the ends of the hole forming the common collector. With such a structure, it is no longer necessary to insert plugs into the bipolar plate, since the oblique intake channel terminates in the collector and not outside the bipolar plate, thereby eliminating any risk of leakage.

Nevertheless, this solution is not fully satisfactory, because the drilling of oblique intake channels demands high accuracy and the use of specific tools. In fact, these two drawbacks are also liable to incur an additional cost in the production of a bipolar plate.

Furthermore, both of these two prior art solutions are incompatible with a reduction of the volume occupied by a fuel cell, because they cannot be implemented on thin bipolar plates. In consequence, these solutions represent a limit to the compactness of a fuel cell. However, the compactness is an important performance criterion for a fuel cell.

Document JP-A-2002 298872 discloses a bipolar plate for a fuel cell whereof one of the edges is traversed by two neighbouring through-holes of which one terminates in a groove. However, this document concerns a bipolar plate of which only one face is functionalised.

It is therefore an object of the present invention to propose a bipolar plate that does not incur any risk for the leaktightness of the fuel cell, of which the geometry does not limit the compactness of the cell, and the production of which does not substantially increase the cost of the cell.

SUMMARY OF THE INVENTION

The present invention therefore relates to a bipolar plate having a simple structure, which is economical to produce, favorable with respect to the leak tightness of the cell, and which allows for a reduction of its volume.

The present invention relates to a bipolar plate for fuel cell, comprising:
- a first through-hole positioned within one of its peripheral edges for circulating a reactive fluid,
- an anode compartment extending at one of its two main faces,
- and a cathode compartment extending at the opposite main face.

According to the invention, at least one of the compartments is formed completely or partially by a region recessed with respect to the corresponding main face, the recessed region being connected to the through-hole via an intake channel for the flow of the reactive fluid into the compartment, the intake channel being recessed within the peripheral edge of the corresponding main face.

According to the invention, the bipolar plate further comprises a second through-hole located near the first through-hole, the second through-hole also intended for circulating the reactive fluid, the main face opposite the face housing the recessed region, comprising a generally non-emergent recessed groove, the groove being suitable for connecting the first and second through-holes.

In other words, one of the edges of the plate is traversed by two neighboring through-holes, of which one forms the reactive fluid collector, and of which the other terminates in an open groove leading to the compartment to be supplied with reactive fluid. In this way, the reactive fluid can flow from the collector to the compartment to be supplied, passing through a groove provided on the face opposite this compartment. The fluid therefore flows along a generally "U" shaped route in a plane intersecting the edge of the plate before discharging into the compartment forming the electrode.

According to a practical embodiment of this first embodiment of the invention, the bipolar plate may have a median axis, the first through-hole being drilled along this median axis.

Thus, in the stack forming the fuel cell, it is possible to superimpose the bipolar plates alternately in one direction and then the other, in order to orient their generally nonemergent grooves in opposite directions. This serves to distribute the reactive fluid alternately to the left and then to the right of the collector. As a consequence, the positioning of each elementary cell at 180° with respect to the preceding cell in the stack serves to ensure the leaktightness of the intake channels and the irrigated compartments by means of a simple intercellular seal.

In practice, the compartments may cover a substantial area of each of the main faces, respectively. Such compartments thus have a high exchange area with the membrane electrolyte, thereby serving to generate a high electric current.

Also in practice, the first and/or second through-hole(s) may have the shape of a cylinder with a circular base, the axis of which is perpendicular to the plane defined by one of the main faces.

Such a through-hole is, in fact, very simple to make by means of a single operation of drilling of the bipolar plate.

According to an alternative embodiment of the invention, the bipolar plate may further comprise a second set of through-holes for the circulation of a second reactive fluid, and a third set of through-holes for the circulation of a cooling fluid.

Like the first through-holes, such through-holes each serve to form a collector for the second reactive fluid and for the cooling fluid.

Furthermore, the invention also relates to a fuel cell comprising a superposition of elementary cells each comprising a bipolar plate as described above. According to the invention, the bipolar plates are separated in pairs respectively by a generally planar seal, each of the seals comprising a membrane electrolyte and through-holes at the peripheral edge of the seal. Moreover, the through-holes of the superimposed bipolar plates and the through-holes of all the seals coincide in order to form a reactive fluid collector common to all the elementary cells.

In other words, the superposition of the through-holes provided in each of the bipolar plates according to the invention serves to form a collector common to all these plates, which thereby extends along the fuel cell.

According to a practical embodiment of the invention, the fuel cell comprises a superposition of elementary cells, formed of plates according to the alternative embodiment of the invention described above, the through-holes of the superimposed bipolar plates and the through-holes of all the seals coinciding in order to form to second and third fluid collectors common to all the elementary cells.

The invention also relates to a fuel cell comprising a superposition of elementary cells of the abovementioned type, the superposition comprising a head-to-tail stack of the bipolar plates.

BRIEF DESCRIPTION OF THE DRAWINGS

The manner in which the invention can be implemented and the advantages thereof will appear clearly from the illustrative but non limiting embodiment that follows, in conjunction with the appended figures.

FIGS. 1A and 1B are schematic perspective representations of a bipolar plate according to a first embodiment of the invention, FIG. 1A showing one of the main faces of this bipolar plate, while FIG. 1B shows the other main face.

DETAILED DESCRIPTION OF THE INVENTION

Figure 1A:
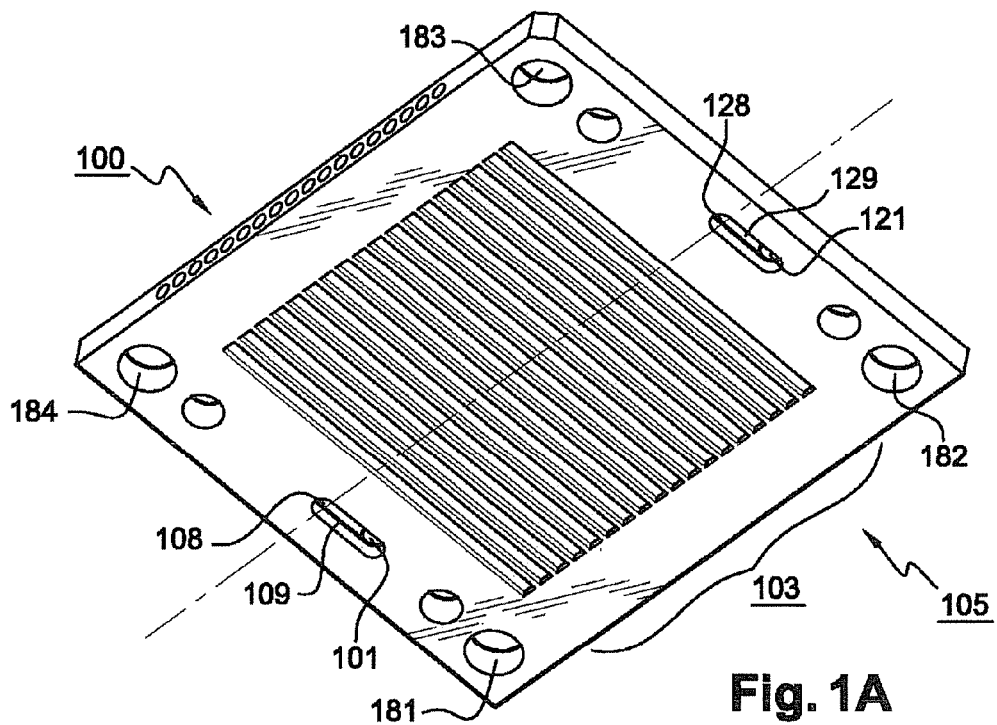

FIG. 1A shows a bipolar plate 100 according to a first embodiment of the invention. The bipolar plate 100 has two main faces 104, 105 on which a cathode 102 and anode 103 compartment extend respectively. The faces 104 and 105 of the bipolar plate 100 are called main faces because they have a large area in comparison with the faces forming the edge of the bipolar plate 100 and because they accommodate most of the functional members of the bipolar plate 100.

Figure 1B:
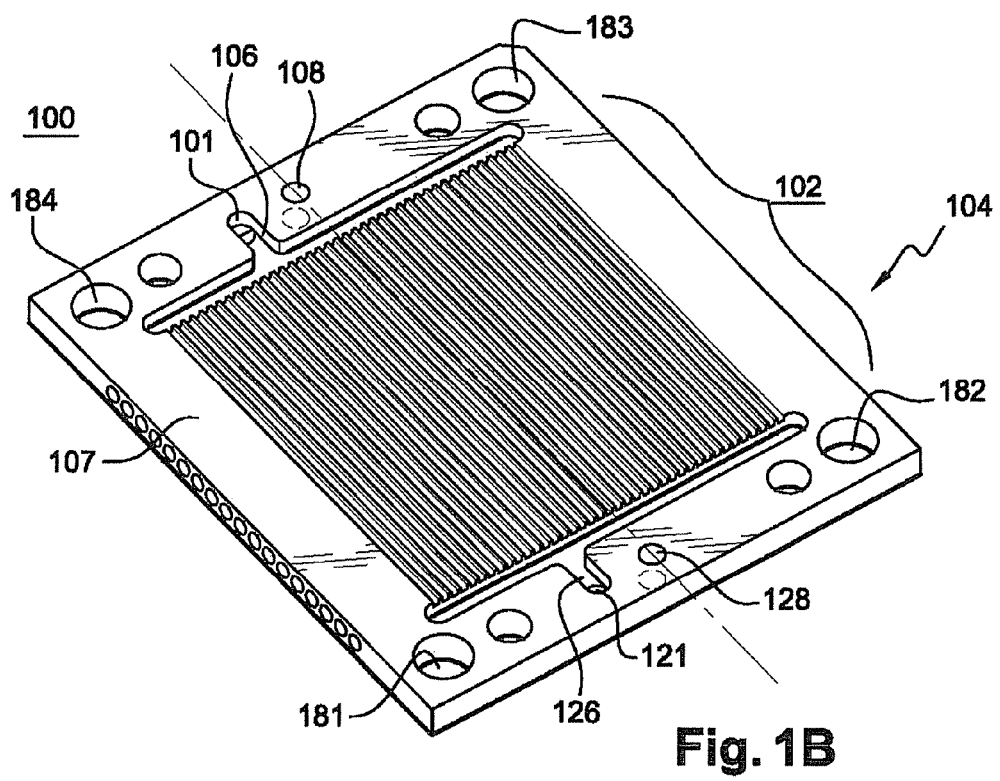

As shown in FIGS. 1A and 1B, the cathode 102 and anode 103 compartments respectively cover a substantial area of the two main faces 104 and 105. Furthermore, these electrodes are formed from a plurality of parallel grooved lines, in order to have a large exchange area with the electrolyte in the form of a membrane in contact with them. In a cross section, these grooved lines therefore have a crenellated profile.

Moreover, at least in the case of the cathode compartment 102, these grooved lines of predefined depth form as many channels for circulating a reactive fluid necessary for the electrochemical half-reaction intended to liberate charge carriers.

Thus, the cathode compartment 102 is formed by a region that is recessed with respect to the main face 104. Moreover, the apex of the grooved lines of the cathode compartment 102 is at the level of the peripheral edge 107 which surrounds the cathode compartment 102. This feature derives from the method for producing the grooves of the cathode compartment 102, which consists in machining a planar plate to strip it from material or to stamp it. This also avoids oversizing the thickness of the peripheral seal that provides the leaktightness between two successive bipolar plates 100. In fact, if the apices of the grooved lines formed a projection from the level of the peripheral edge 107, a very thick seal would have to be provided to ensure the leaktightness with regard to the fluids.

Figure 3:
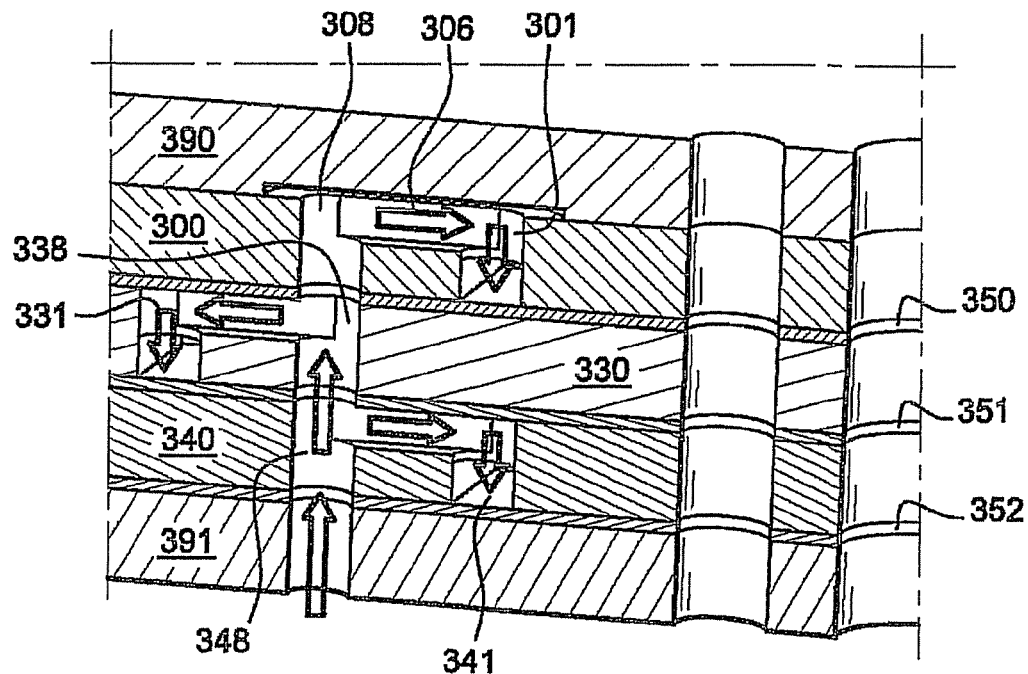
FIG. 3 is a schematic cross section and perspective representation of a fuel cell according to an embodiment of the fuel cell of the invention.
Figure 4:
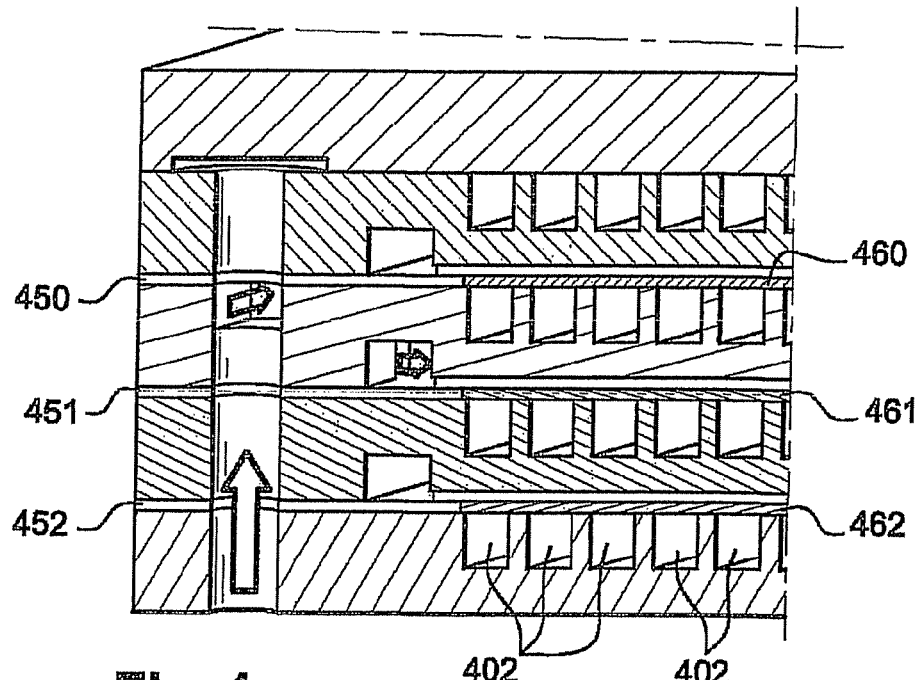
FIG. 4 is a schematic cross section and perspective representation of the fuel cell in FIG. 3 along a plane located further forward.

According to the invention, the bipolar plate 100 comprises a first through-hole 108, intended for circulating reactive fluids. In fact, when a plurality of elementary cells comprising similar bipolar plates are superimposed upon one another to form a fuel cell, the through-holes corresponding to the hole 108, which are made on each of the bipolar plates, coincide and thereby form a common collector, as shown in FIGS. 3 and 4 which are described in detail below.

According to another feature of the bipolar plate of the present invention, the recessed region that forms the cathode compartment 102 is connected to the through-hole 101 via an intake channel 106 for the supply of reactive fluid. The channel 106 is recessed within the peripheral edge 107 of the main face 104. Thus, all or part of the reactive fluid arriving via the through-hole 101 forming the common collector passes through or bypasses the intake channel 106 to the grooved lines forming the cathode compartment 102.

Moreover, the bipolar plate 100 has other through-holes for performing various functions. Thus, the holes 181-184 serve each to accommodate clamping means (not shown), for ensuring the cohesion of the stack of bipolar plates forming the fuel cell.

The alternative embodiment shown in FIGS. 1A and 1B has a "U" shaped route for reactive fluid. Thus, according to this alternative, the common collector is formed by the superposition of the through-holes 108 of each bipolar plate, connected to the through-holes 101 via a groove 109 to supply the zone 102 with reactive fluid via the channel 106.

For this purpose, each bipolar plate 100 therefore comprises a second through-hole 101, also for circulating the reactive fluid, and provided near the first through-hole 108, therefore also on the peripheral edge 107.

In consequence, when the elementary cells (bipolar plates and inserted seals) are stacked, as shown in FIGS. 3 and 4 described below, all the holes of type 108 coincide to form the common collector for circulating a reactive fluid.

To allow the flow of the reactive fluid from the through-hole 108 to a recessed cathode compartment 102 via the intake channel 106, a generally non-emergent groove 109 is provided on the peripheral edge 113 of the main face 105 opposite the face accommodating the cathode compartment 102. The groove 109 is recessed in the bipolar plate 100 and is positioned and dimensioned to correspond with the positions of the through-holes 101 and 108.

Thus, when two successive bipolar plates are stacked with their main faces 104 and 105 opposite each other, the groove 109 is located at the through-holes 101 and 108. In the example in FIGS. 1A and 1B, the groove is straight and its length is such that the holes 101 and 108 pass through it at each of its two ends. However, other shapes of grooves 109 are feasible with other positions of the holes relative to the groove without necessarily falling outside the scope of this invention. Thus, the groove 109 could have a "L" shape or a "C" shape, etc.

In such a structure, the reactive fluid therefore passes through the orifice 108 forming a common collector, and is partly diverted in the groove 109, and this diverted stream of reactive fluid flows into the intake channel 106 from where it spreads into the cathode compartment 102.

Similarly and symmetrically, the peripheral edge may, on the other side of the cathode compartment 102, accommodate a first through-hole 121 cooperating with an intake channel 126.

Furthermore, in the example in FIGS. 1A and 1B, the bipolar plate 100 comprises a second through-hole 128 symmetrical with the through-hole 108 suitable for cooperating with a generally non-emergent groove 129, similar to the groove 109. The second common collector formed by the stack of through-holes 128 can serve to convey or to remove the reactive fluid, or oxidiser, towards or from the cathode compartment 102.

To circulate other fluids, for example a second reactive fluid or a cooling fluid, it is possible to reproduce, at other locations of the bipolar plate, the system comprising two through-holes cooperating with an intake channel.

Figure 5:
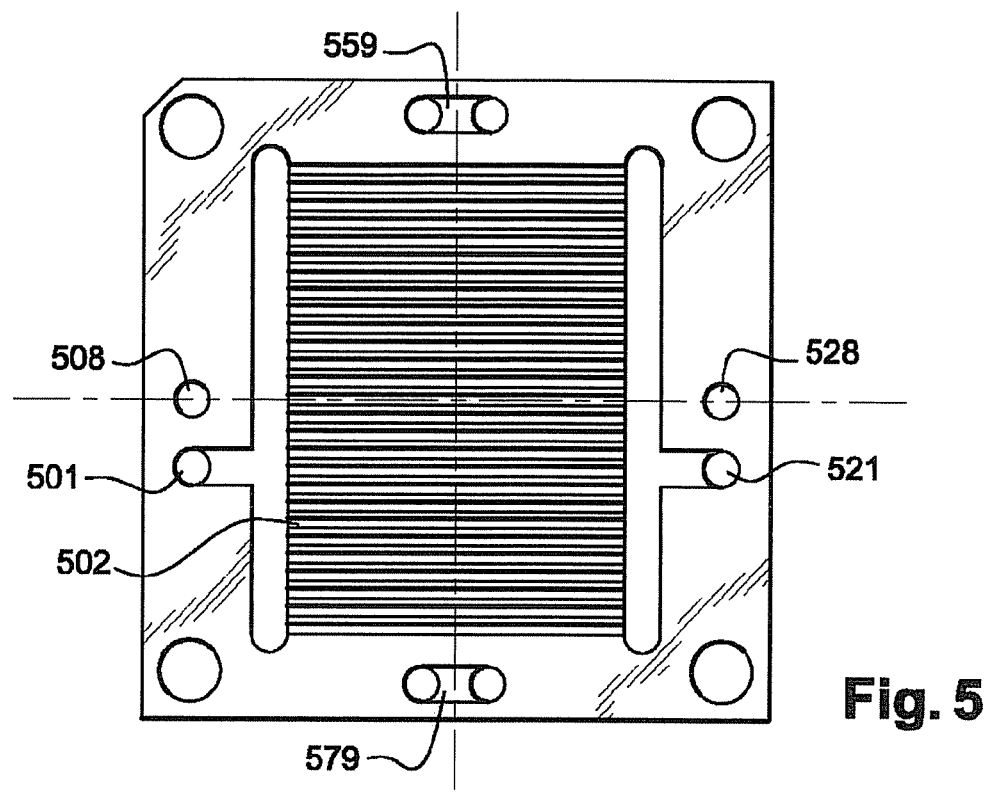
FIGS. 5 and 6 are schematic plan view representations of a bipolar plate according to a second and third embodiments of the invention.
Figure 6:
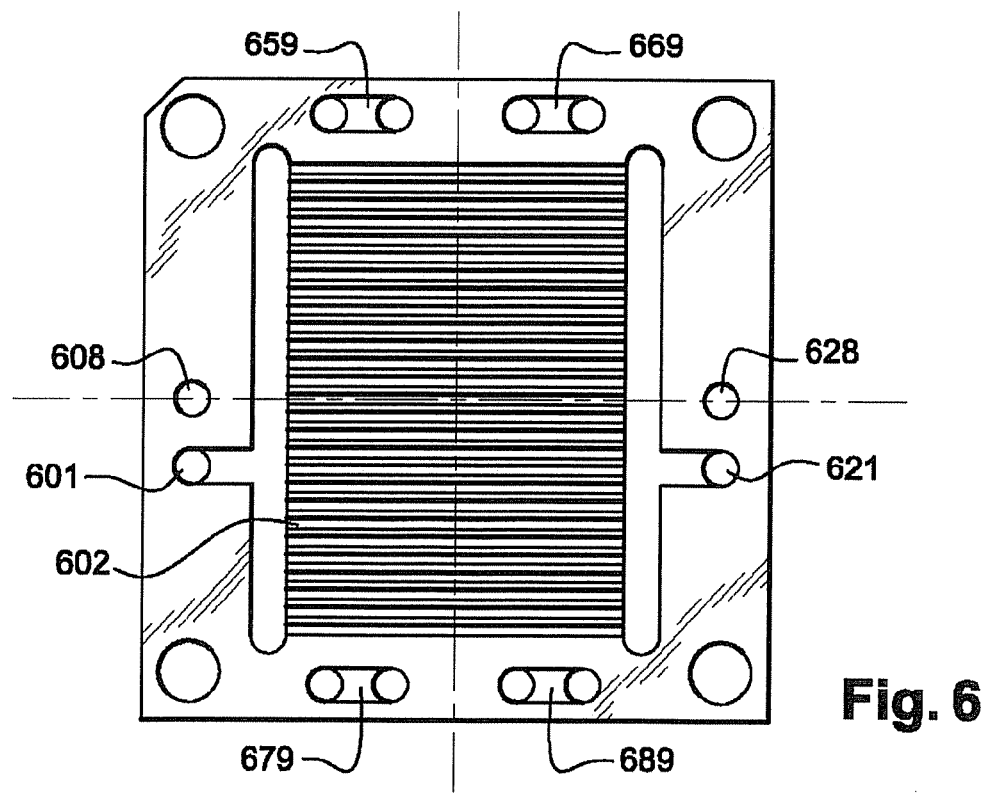

Thus, according to the embodiments of the invention illustrated in FIGS. 5 and 6, the second and third machined oblong sets 559, 579; 659, 679, 669 and 689 are provided for circulating other fluids, such as the second reactive fluid. Like the machined sets 109 and 129 shown in FIG. 1A, the second and third machined oblong sets 559, 579; 659, 679, 669 and 689 comprise two circular through-holes for circulating fluids in a "U" shaped route. These circular through-holes can be made like the holes 501, 508, 521, 528; 601, 608, 621, 628 forming the first set of through-holes, provided to supply the electrodes 502, 602.

As in the case in FIG. 5, the second set of through-holes 559, 579 can be positioned on the axis perpendicular to the axis of the first set 109, 129. Thus, by symmetry, the stack of bipolar plates serves to make the through-holes coincide in order to define a common collector for the entire fuel cell.

In the case in which a third fluid (FIG. 6) is to be circulated, such as a cooling fluid, the second 659, 679 and third 669 and 689 sets of through-holes can be positioned symmetrically about an axis of symmetry and equidistant from the other axis of symmetry of the bipolar plate, as shown in FIG. 6. This serves to ensure the cooperation of the through-holes of two bipolar plates stacked within a fuel cell.

Figure 2:
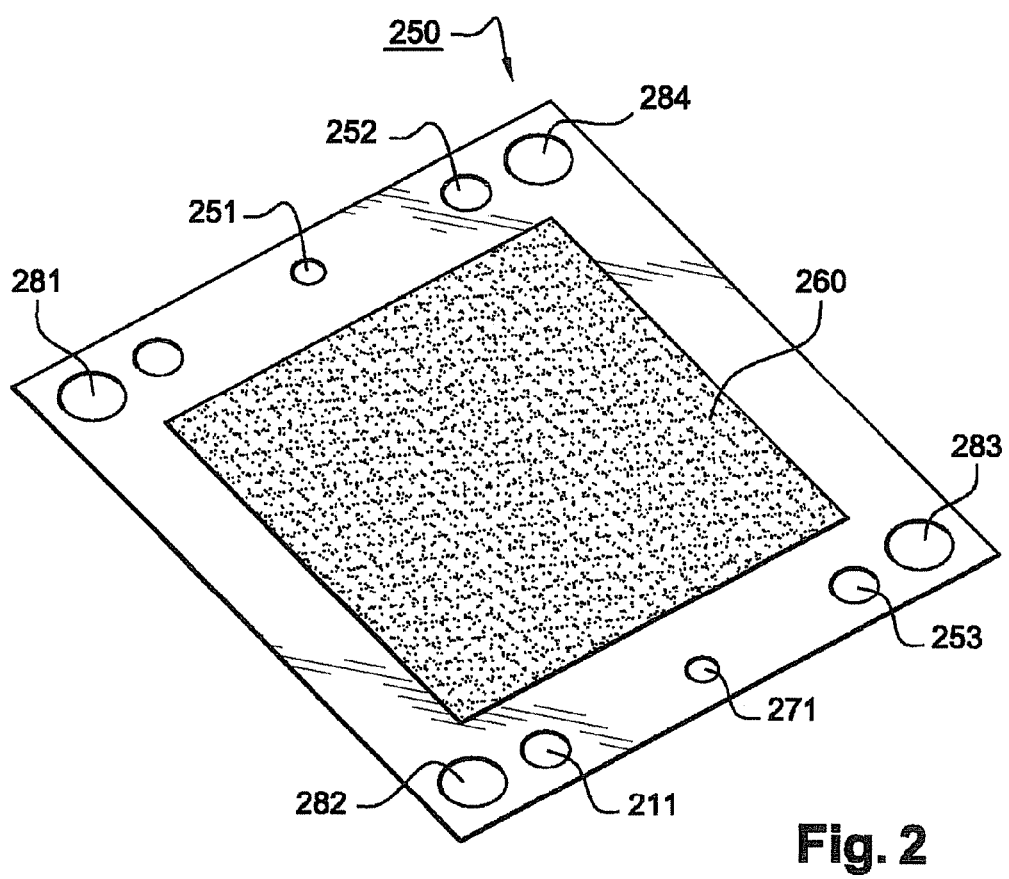
FIG. 2 is a schematic perspective representation of an intercellular seal inserted between two bipolar plates according to the invention.

FIG. 2 shows the part complementary to the plates 100 for forming an elementary cell, that is an inserted seal 250 intended to be placed between two successive bipolar plates 100. The inserted seal 250 is placed so as to produce contact between the membrane electrolyte zone 260 and the cathode compartment 102 of a bipolar plate 100, and with the anode compartment 103 of the next bipolar plate. To maximise the exchanges at the interface between electrolyte and electrode, the membrane electrolyte 260 has an area similar and corresponding to the area occupied by the cathode 102 and anode 103 compartments.

Moreover, the insert seal 250 has through-holes 251 and 271, whose positions and dimensions correspond respectively to those of the holes 108 and 128 passing through the bipolar plates of type 100. Thus the oxidiser can flow unhindered along the common collectors formed by the stacks of holes of type 108 and 128.

Furthermore, the insert seals 250 have other through-holes 211, 252, 253, 281-284, whose positions, dimensions and functions correspond to those of the holes 181-184 passing through the bipolar plate shown in FIG. 1, that is orifices for centering the stack of plates.

FIG. 3 shows a stack of bipolar plates 300, 330, 340, corresponding to the alternative shown illustrated by the bipolar plate 100 in FIGS. 1A and 1B, with insert seals 350, 351 and 352 corresponding to the embodiment of the insert seal 250.

According to the alternative embodiment described with regard to FIGS. 1A and 1B, each of the bipolar plates 300, 330 and 340 has a first through-hole 301 similar to the first through-hole 101, and a second through-hole 308 similar to the second through-hole 108.

Moreover, the bipolar plates 300, 330 and 340 each have an intake channel 306 similar to the intake channel 106. Thus, the reactive fluid can flow in the common collector formed by the through-holes 308, and then into the intake channels of type 306, from where it spreads into the hole 301 and above all, into the anode compartment (not shown in FIG. 3). The reactive fluid thereby describes a "U" shaped route before entering the electrode to be supplied.

The stack of bipolar plates 300, 330 and 340 shown in FIG. 3 is distinguished from the others in that the plates are mounted with their intake channels placed alternately to the right and left of the common collector. For this purpose, according to one of the embodiments of the invention, the through-holes 308, 338 and 348 forming the common collector must be positioned respectively on one of the median axes of their bipolar plate. This accordingly has a symmetry allowing a head-to-tail stacking of the bipolar plates, as shown in FIG. 3.

With such an assembly, the through-holes 301, 331 and 341 do not coincide with one another, so that they do not form a second common collector parallel to the collector formed by the holes 308. Such a structure serves to ensure an effective and leaktight distribution of the reactive fluid to the cathode compartments of each of the bipolar plates of the stack. Moreover, the assembling of the bipolar plates is simpler. Besides, the bipolar plates may be thinner than those of the prior art, thereby serving to obtain denser cells.

As shown in FIG. 3, the insert seals 350-352 are disposed between the successive bipolar plates 300, 330, 340, in order to make the holes passing through them coincide with those passing through the bipolar plates. Thus, it is possible to pass, through the entire fuel cell, the reactive fluids, fuels and oxidisers, one or more cooling fluids, as well as clamping means for the cohesion of the fuel cell.

Moreover, the fuel cell shown in FIG. 3 has two terminal plates 390 and 391 located at each end of the stack of bipolar plates 300, 330 and 340. The terminal plates 390, 391 are produced, in a manner known per se, to perform the functions assigned to them. The stack of elementary cells, bipolar plates and insert seals, shown in FIG. 3, therefore comprises three bipolar plates 300, 330, 340, but it could comprise a different number thereof, according to the desired capacity of the fuel cell.

FIG. 4 shows a cross section similar to that in FIG. 3, in which the cutting plane is located slightly forward from the cutting plane in FIG. 3. In FIG. 4, besides the through-holes and the intake channels of the bipolar plates, electrolytic zones 460-462 can be distinguished, associated with the membranes forming the insert seals 450-452.

As may be observed in FIG. 4, the membrane electrolytes 460-462 therefore adjustably cover the surfaces occupied by the cathode compartments, of which the grooved lines 402 (crenellated) are observed in a cross section. Thus, the reactive fluid can only cause reactions in the zones 460-462 and not in the intake channels of the bipolar plates. This arrangement serves to optimise the yield of the cathode reactions and the collection of the charge carriers that they liberate.

The particular embodiment of the invention described in relation to the figures concern the cathode compartments of the bipolar plates. However, a similar structure and operation can be provided for the anode compartments. These embodiments, involving a few machining and/or stamping operations, thereby serve to form sealed fluid intake systems, including in relatively thin bipolar plates.

In the example in the figures, the through-holes have the shape of a cylinder with a circular base. However, they could have a different cross section, for example oblong or square, without necessarily falling outside the scope of this invention. Similarly, the thickness of the bipolar plates, the length and depth of the grooved lines of the anode and cathode compartments, the diameters of the holes and the grooves and the intake channels are dimensioned, as required, according to the electrical capacity and the electrochemical yield desired for the fuel cell. Moreover, the bipolar plate could, depending on the desired applications, have a non-square cross section, for example circular, etc.

The invention claimed is:

1. A fuel cell, comprising a superposition of a plurality of elementary cells, each said elementary cell comprising a bipolar plate, each said bipolar plate comprising:
    a first through-hole positioned within a peripheral edge of said bipolar plate for circulating a reactive fluid;
    an anode compartment extending at one of two main faces of said bipolar plate; and
    a cathode compartment extending at the opposite main face of said bipolar plate;
    wherein at least one of said anode and said cathode compartments of said bipolar plates is formed completely or partially by a recessed region with respect to a corresponding main face of said bipolar plate, said recessed region being connected to the first through-hole via an intake channel for the flow of the reactive fluid into said compartment, said intake channel being recessed within a peripheral edge of said corresponding main face of said bipolar plate; and
    a second through-hole intended for circulating the reactive fluid, located near the first through-hole;
    wherein said main face of said bipolar plate opposite said face housing said recessed region comprises a recessed groove, suitable for connecting the first and second through-holes; and
    wherein the first through-holes of respective ones of said bipolar plates coincide to define a common collector, and wherein said second through-holes of respective ones of said bipolar plates do not coincide.

2. The fuel cell according to claim 1, wherein each said bipolar plate has a median axis, and wherein the first through-hole is drilled along said median axis of said bipolar plate.

3. The fuel cell according to claim 1, wherein the compartments of said bipolar plates respectively cover each of said main faces of said bipolar plates.

4. The fuel cell according to claim 1, wherein a shape of the first and/or second through-holes is a cylinder having a circular base, and wherein an axis thereof is perpendicular to a plate defined by one of said main faces of said bipolar plate.

5. The fuel cell according to claim 1, wherein each said bipolar plate further comprises a set of through-holes for circulating a second reactive fluid, and a set of through-holes for circulating a cooling fluid.

6. The fuel cell according to claim 1, wherein said bipolar plates are separated in pairs respectively by a generally planar seal, each of said seals comprising a membrane electrolyte and through-holes at a peripheral edge of the seal; and wherein the first through-holes of the superimposed bipolar plates and the through-holes of all the seals coincide in order to form a reactive fluid collector common to all of the elementary cells.

7. The fuel cell according to claim 5, wherein said bipolar plates are separated in pairs respectively by a generally planar seal, each of said seals comprising a membrane electrolyte and through-holes at a peripheral edge of the seal; and wherein the through-holes for circulating a second reactive fluid and the through-holes for circulating a cooling fluid of the superimposed bipolar plates and the through-holes of all the seals coincide in order to form second and third fluid collectors common to all the elementary cells.

* * * * *